W. E. SAWYER.
Electric-Meter.
No. 210,151. Patented Nov. 19, 1878.
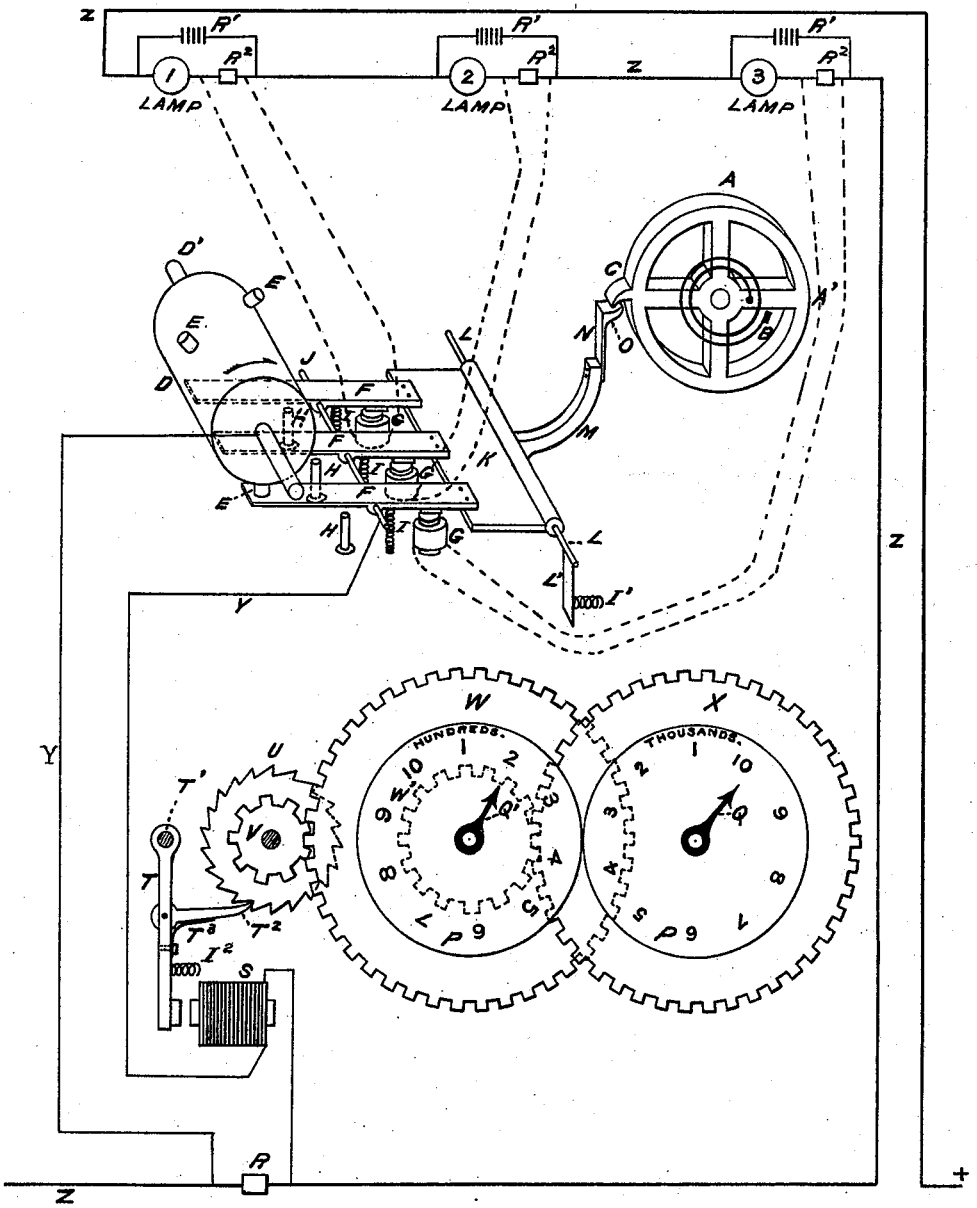
WITNESSES.
Thomas Smith
Amos Broadnax
INVENTOR.
W. E. Sawyer.

UNITED STATES PATENT OFFICE.

WILLIAM E. SAWYER, OF NEW YORK, N. Y.

IMPROVEMENT IN ELECTRIC METERS.

Specification forming part of Letters Patent No. 210,151, dated November 19, 1878; application filed October 17, 1878.

*To all whom it may concern:*

Be it known that I, WILLIAM EDWARD SAWYER, of the city, county, and State of New York, have invented a new and useful Electric Meter; and I do hereby declare the following to be such a description of the same, reference being had to the accompanying drawing, making part of this specification, as will enable any one skilled in the art or science to which it appertains, or with which it is most nearly connected, to make, construct, and use the invention.

In Letters Patent of the United States No. 191,111, heretofore granted to me as sole inventor, and in other Letters Patent No. 205,303, granted to me and to Albon Man, of Brooklyn, and State aforesaid, as joint inventors, certain methods of dividing the current from a single generator among two or more electric lamps, or other electrical apparatus, are fully shown and described.

The object of my present invention is to provide a meter or register of the current expended in the production of electric light as applied to an electric lamp or group of lamps, and such a device being entirely new in the arts I intend to claim it broadly, not only as a meter or register, but in its combination with an electric light; and I do not confine myself to any particular device or arrangement of parts.

The meter I prefer is one which indicates with dial-hands the current expended, in which respect the apparatus of my invention does not differ from an ordinary gas-meter; and I prefer to actuate it by electro-magnetism, although I have very fully considered apparatus for registering by marks or indentations made upon a roll of paper, and mechanism energized by the expansion of metallic conductors from electrical heading.

The best form of electric-light meter I have found to be that of a time-meter—that is to say, I prefer as a meter one which operates to record the time during which a lamp is lighted rather than the quantity of current used, since the quantity of current being easily determined the element of time is the prime factor in ascertaining the amount of current consumed. Therefore I would place in a building supplied with electric lamps a meter which should indicate exactly how many hours in a given period these lamps may be lighted—viz., a meter which, if there are ten lamps in a building, and each of them is run for ten hours, would indicate a use of one hundred hours.

It is presumable that at least as often as once a month the record will be noted, and I prefer to actuate the mechanism by an ordinary clock-work, which shall be wound up once a month, although it is clear that I may employ a clock-work actuated by the electric current which operates the lamps, and which shall never require winding up.

For the sake of simplicity, I have shown in the drawing only the salient parts of my invention, omitting the clock-work as being a well-known apparatus, and also omitting—what will naturally suggest itself—a protecting-cover and lock, to render the apparatus accessible only to the proper parties.

Referring now to the drawing accompanying and forming a part of this specification, D is a metallic cylinder, fixed to shaft D', which is provided with suitable bearings, (not shown,) and rotated by the clock-work, of which the reciprocating balance-wheel A, (or it may be a pendulum,) actuated in one direction by spring B, the nature of which is so clear as to render explanation unnecessary, constitutes the governor.

The cylinder D is provided with as many metallic contact-pins, E, set spirally, as there are lamps whose operation is to be registered; and these pins, as the cylinder is rotated in the direction of the arrow, make connection when the lamps are in operation with the spring armature-levers F of electro-magnets G.

When there is no current flowing in the coils of magnets G, the levers F are forced by springs I away from the magnets to contact with the stops H, so that the pins E may pass without making connection with the levers. All of the armature-levers F work freely upon shaft J, held in appropriate standards. (Not shown.)

Running along under the outer ends of the levers F is a metal strip, K, fixed to shaft L L, which, when the magnets G are not energized, is forced upward by spiral spring I', acting against arm L' fixed to shaft L L. To this metal strip K is fixed an arm, M, carrying a light flat spring, N, to which is fixed a bent piece, O, the object of which will soon be made apparent.

The current entering at the — point traverses a resistance, R, passes through the several lighting apparatus of lamps 1, 2, and 3, and thence outward at the + point. $R^1 \ R^1 \ R^1$ represent the lamp-lighting apparatus. (Shown in Letters Patent of the United States, number as aforesaid, heretofore granted to me as sole inventor, and to me and to Albon Man as joint inventors, number as aforesaid.)

The resistances $R^2 R^2 R^2$ serve when a lamp is lighted, to direct a portion of the current through the coils of the electro-magnets G G G, the currents being as shown by the broken lines.

To understand the operation of my invention, let it be assumed that the lamps are not actuated. The magnets G not being energized their armature-levers F are raised, and the strip K, also being raised, holds the bent piece O in the path of the bent piece C, fixed to the chronometer-balance A, and the motion of the clock-work, (not shown,) and consequently of cylinder D, is stayed. At this point a lamp is lighted; instantly one of the magnets G is energized, its armature-lever F is attracted, and, coming in contact with the strip K, the strip K is depressed, bent piece O thrown to the left, and an impetus imparted to the chronometer-balance by reason of the effort of bent piece O to disengage itself from bent piece C. The bent piece O no longer being in the path of C, the balance A begins and continues its reciprocating motion, passing from the position shown in the drawing to that in which the point C reaches the point A′, and thence back again, thus permitting the cylinder D to rotate in the direction of the arrow.

It makes no difference which of the armature-levers F is actuated; any one (or all of them together) serves to set the clock-work in motion. It will be clear that the clock-work may be kept continually in motion; but I have preferred that the clock-work shall run only so long as the lamps are run.

Let it be now assumed that the lamps are all extinguished. There being no magnet G energized, and no levers F depressing the strip K, the bent piece O drops into the path of C, which, as the balance A carries it to the left, rides over piece O by the yielding of spring N, and the motion of the clock-work is stopped.

The effect of the rotation of the cylinder D is as follows: By means of the resistance R, a portion of the current of the branch or main − +, when a pin, E, makes connection with a lever, F, as shown by the circuit of the light lines, is caused to energize an electro-magnet, S, the current passing from one side of R to the cylinder D, thence by way of a pin, E, to a lever, F, and thence by way of shaft J to the magnet S and armature to the other side of R. If but one lamp is lighted the magnet S will be energized but once in a revolution; if two are lighted it will be energized twice, and if three are lighted, three times, and so on. At each action of the magnet S its armature-lever T, pivoted at $T^1$, is attracted against spiral spring $I^2$, and by means of pawl $T^2$, held upward by spring $T^3$, causes the ratchet-wheel U to rotate one tooth. Thus if but one lamp is in operation the ratchet U will move but one tooth in one revolution of the cylinder D, and if all the lamps are in operation the ratchet will be constantly rotated by the constant vibration of armature-lever T.

The operation of the remainder of the apparatus is self-apparent, there being as many gears and pinions, hands, and dials as may be desired. The pinion V, fixed to ratchet U, actuates gear W; and pinion W′, fixed to gear W, actuates gear X. The hands Q and Q′ indicate upon the dials P P the current expended.

To properly estimate the "consumption" of current, so to speak, a lamp should be operated for a given number of hours, and the indication upon the dials noted. A single lamp operated for the same length of time will invariably present the same record, and two lamps will present a record of twice the value of one lamp, and so on, to any extent desired.

Having thus described my invention, I claim and desire to secure by Letters Patent—

1. In a system of two or more electric lamps or groups of lamps, an electric meter consisting of a registering apparatus and a rheotome or circuit-breaker driven by clock-work or other well known mechanical appliances, and operating to intermittently actuate the registering apparatus, when a lamp or lamps, or a group of lamps, is lighted.

2. In a system of two or more electric lamps or groups of lamps, an electric meter consisting of a registering apparatus and as many separate electric parts or apparatus connected to the lamps or groups of lamps as there are lamps or groups of lamps in circuit, each of said electrical parts or apparatus being separately connected with its respective lamp or group of lamps, and each separately actuating the register.

3. In an electric meter, the combination of two or more electro-magnets, G G, and their armatures, the action of any one or more of which will start the register and denote the time any one or more lamps of a series is illuminated and the amount of current consumed in that time by each lamp.

4. In an electric meter, a separate electro-magnet, S, and its armature, by which the registering device is operated, in combination with one or more electro-magnets, G, by which the machinery of the meter is started, the two magnets to be connected, substantially as described, by which a series of electric impulses through G are successively concentrated upon S and made to register the current of each lamp in the series.

5. The combination, with two or more electric lamps or groups of lamps, of a single registering-meter, common to all of them, constructed to register for each and all of the lamps, substantially as shown and described.

WILLIAM EDWARD SAWYER.

Witnesses:
THOMAS SAULT,
AMOS BROADNAX.